(12) United States Patent
Sirrine

(10) Patent No.: US 7,660,710 B2
(45) Date of Patent: Feb. 9, 2010

(54) DRIVELINE ANGLE ANALYZER

(75) Inventor: Scott A. Sirrine, Kalamazoo, MI (US)

(73) Assignee: Eaton Corporation, Cleveland, OH (US)

( * ) Notice: Subject to any disclaimer, the term of this patent is extended or adjusted under 35 U.S.C. 154(b) by 1008 days.

(21) Appl. No.: 09/736,232

(22) Filed: Dec. 14, 2000

(65) Prior Publication Data

US 2003/0019293 A1 Jan. 30, 2003

(51) Int. Cl.
G06G 7/48 (2006.01)
(52) U.S. Cl. .................. 703/8; 703/6; 703/7; 73/488
(58) Field of Classification Search .................. 703/8, 703/7, 6; 73/488; 709/100
See application file for complete search history.

(56) References Cited

U.S. PATENT DOCUMENTS

| | | | | |
|---|---|---|---|---|
| 5,848,371 | A * | 12/1998 | Creger | 701/101 |
| 6,077,302 | A | 6/2000 | Kumra et al. | 703/7 |
| 6,128,959 | A | 10/2000 | McGovern et al. | 73/660 |
| 6,345,826 | B1 * | 2/2002 | Kurzeja et al. | 280/5.5 |

OTHER PUBLICATIONS

Eaton Corporation, "Eaton Truck Components Bulletin, TRIB-9701", 1997.*

Eaton Corporation (Eaton), "DOS-Based Driveline Angle Analyzer (DAA) Screen Captures", 1995, 6 pages. (Applicant mailed Jul. 14, 2005, in response to Requirement for Information—37 C.F.R. §1.105, dated May 16, 2005).*
Phillips et al., "A PC-based Vehicle Powertrain Simulation for Fuel Economy and Performance Studies", International Journal of Vehicle Design, vol. 10, No. 6, 1989, pp. 639-658.*
Rubin et al., "Development of the Automotive Research Center (ARC) Powertrain System Dynamic Models", ICE-vol. 28-1, 1997 Spring Technical Conference, Paper No. 97-ICE-10, 1997, pp. 79-85.*

* cited by examiner

Primary Examiner—Kamini S Shah
Assistant Examiner—Herng-Der Day
(74) Attorney, Agent, or Firm—Rader, Fishman & Grauer PLLC

(57) ABSTRACT

A Driveline Angle Analyzer (DAA) for determining a torsional acceleration and inertias of a vehicle driveline by entering measurements of a vehicle driveline configuration into a graphical user interface program. The user selects the driveline configuration of interest from a plurality of driveline configurations. Then, the user enters information, such as driveline measurements relating to the selected driveline configuration. To aide in gathering the correct information, the user can print out a worksheet for the selected driveline configuration. After the user inputs the information for the selected driveline configuration, the user can select a corrective mode that allows the user to improve the selected driveline configuration. For example, the user can change the angle of a component with the surrounding components by changing their angles and/or length while enabling the components to stay connected to each other, thus maintaining the vehicle's driveline geometry.

24 Claims, 18 Drawing Sheets

DRIVELINE ANGLE ANALYZER

FIELD OF THE INVENTION

The present invention relates to a method for diagnosing and correcting vehicular driveline angles, and in particular to a method for determining and correcting driveline inertia and torsional acceleration by using an interactive graphical user interface program.

BACKGROUND OF THE INVENTION

By way of background, a driveline angle (also known as the working angle) refers to the difference of the component angles on the drive side and driven side of a U-joint. All angle measurements are taken with zero degrees being parallel to the ground. As shown in FIGS. 1a and 1b, each component on either side of the U-joint will rotate at the same rotational speed when the difference of the component angles on the drive side and driven side of the U-joint is zero. As shown in FIGS. 2a and 2b, if the difference of the component angles is not zero, then the U-joint will cause the component on the driven side of the U-joint to rotate at a changing rate when the U-joint is rotated.

As shown in FIG. 3, the speed of the component on the driven side of the U-joint will increase and decrease twice each 360 degree rotation. The constantly changing acceleration is commonly known as torsional acceleration and is measured in radians per second squared (rad/sec*2), where 1 radian is equal to 57 degrees. Torsional accelerations caused by the effect of U-joints are referred to as $2^{nd}$ order torsionals (twice per rotation of the driveshaft). The effect of U-joint torsional acceleration can be cancelled for each driveshaft by ensuring that the working angles of the U-joints at each end of the driveshaft both have the same working angle.

In addition to torsional acceleration, an inertial component is generated and is commonly known as driveline inertia, which is measured in foot pounds (ft-lbs). Typically, there are two overall system inertia values, drive and coast. Drive inertia occurs when power is being supplied by the engine through the transmission to the drive train. Coast inertia occurs when the vehicle is coasting and power is being supplied by the inertia of the vehicle and passing back through the axles to the rest of the drive train. Unlike U-joint torsional acceleration, the effect of driveline inertia cannot be cancelled by ensuring that the working angles of the U-joints at each end of the driveshaft both have the same working angle. However, the driveline inertia can be reduced by reducing component working angles and/or by using lower inertia driveline components.

An improperly set driveline angle can cause high driveline inertia and torsional acceleration. In general, the greater the working angles, the greater the potential for high driveline inertia and torsional acceleration. An improperly set driveline angle can result in increased vibration, noise, and a reduction of the life of the driveline. For example, the vehicle can exhibit growling during acceleration or deceleration. Typically, the growl is caused from the gearing going through backlash at low torque or float conditions and is more prevalent during deceleration or lightly loaded torque conditions.

In addition, an improperly set driveline angle can cause decreased durability or potential failure of driveline components. For example, the transmission may fail due to synchronizer pin breakage, synchronizer ring breakage, auxiliary drive gear and mainshaft spline wear, and auxiliary drive gear and range sliding clutch teeth fretting. The axle may fail in the vicinity of the power divider. Also, increased wear may occur to the carrier bearings, the slip spline and fretting may occur to the U-joint. Thus, it is desirable to provide an user-friendly tool for diagnosing and correcting problems associated with improperly set driveline angles.

SUMMARY OF THE INVENTION

The invention relates to a method of determining a torsional acceleration of a vehicle driveline by entering measurements of the vehicle driveline into an interactive graphical user interface program. The user selects the driveline configuration of interest from a plurality of driveline configurations. Then, the user enters information, such as driveline measurements relating to the selected driveline configuration. To aide in gathering the correct information, the user can print out a worksheet for the selected driveline configuration. After the user inputs the information for the selected driveline configuration, the user can select a corrective mode that allows the user to improve the selected driveline configuration. For example, the user can change the angle of a component with the surrounding components by changing their angles and/or length while enabling the components to stay connected to each other, thus maintaining the vehicle's driveline geometry.

Various aspects and advantages of this invention will become apparent to those skilled in the art from the following detailed description of the preferred embodiment, when read in light of the accompanying drawings.

BRIEF DESCRIPTION OF THE DRAWINGS

FIG. 16 shows a "Driveline Angle Analyzer" corrective mode screen in which the user can interactively correct for the torsional accelerations and driveline inertias as determined by the DAA program.

FIG. 18 shows a "Print Results" screen displayed by the DAA program for the "Baseline" measurements of the selected driveline configuration.

FIG. 19 shows a "Print Results" screen displayed by the DAA program for the "Corrected" measurements of the selected driveline configuration.

FIG. 20 shows a screen-formatted "Worksheet" screen displayed by the DAA program for a "2-Piece Main with Auxiliary and 2 Axles" driveline configuration similar to the screen of FIG. 8.

FIG. 21 shows a screen-formatted "Worksheet" screen displayed by the DAA program for a "6×6" driveline configuration similar to the screen of FIG. 8.

DETAILED DESCRIPTION OF PREFERRED EMBODMIENTS

A system and method for an interactive Driveline Angle Analyzer (DAA) for determining torsional acceleration and inertia of a vehicle driveline configuration by using an interactive graphical user interface program will now be described. The DAA program can be written using any well-known programming language, and preferably is written in a programming language that can be executed on the Windows® 95/98/NT 4.0 operating systems.

Figure 1B:
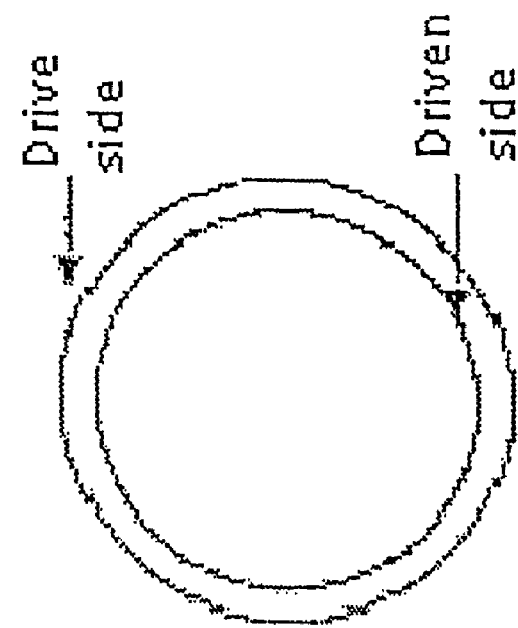
FIGS. 1a and 1b show a side view and an end view of a U-joint with a zero degree working angle, respectively.
Figure 1A:
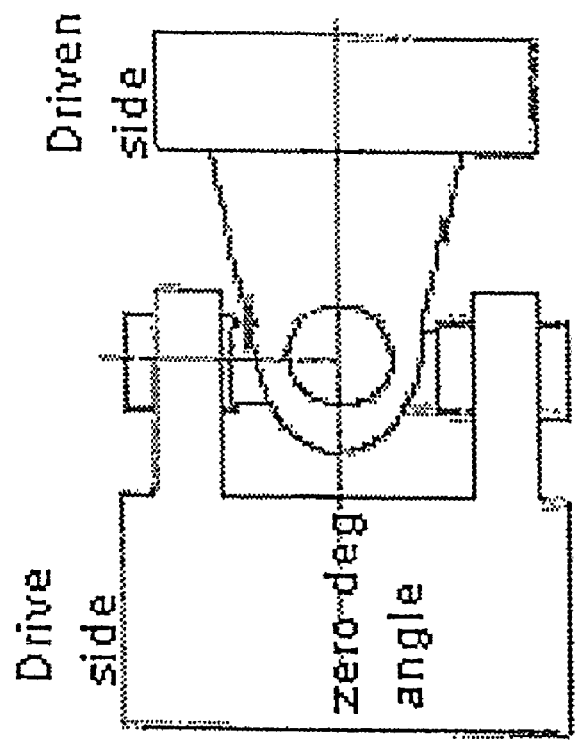
Figures 2A, 2B:
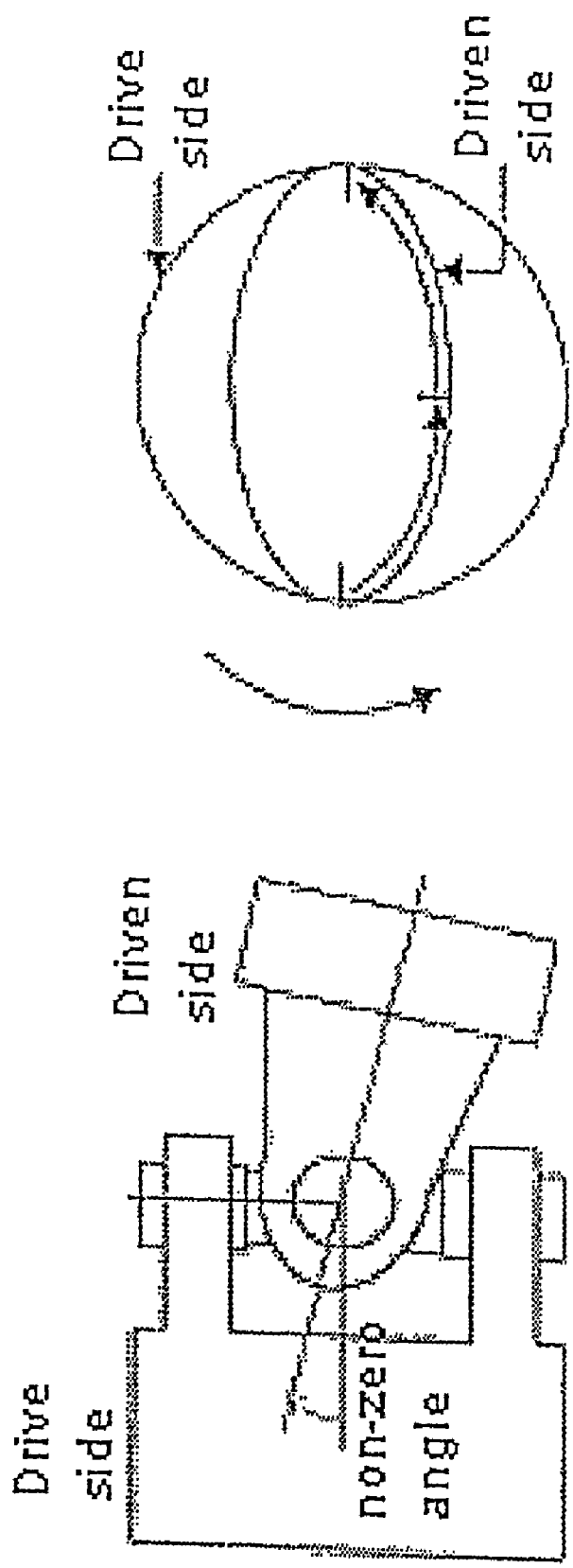
FIGS. 2a and 2b show a side view and an end view of a U-joint with a non-zero degree working angle, respectively.
Figure 3:
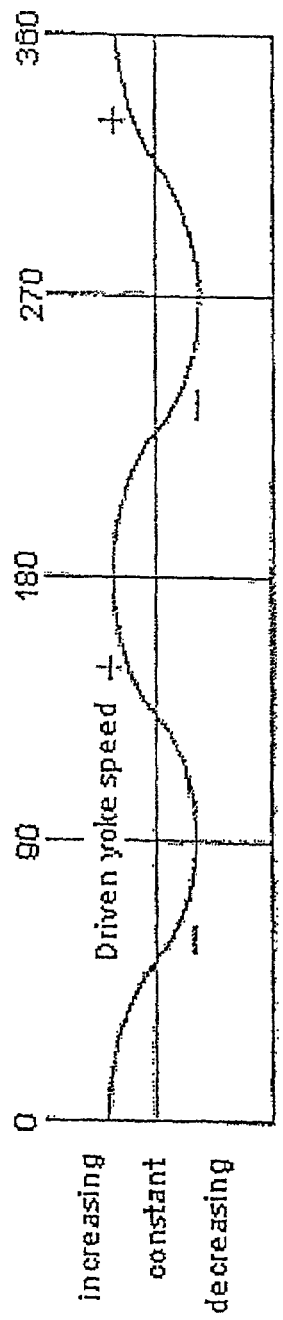
FIG. 3 shows a graph showing the driven-side yoke speed for zero/non-zero working angles during 360 degrees of rotation.
Figure 4:
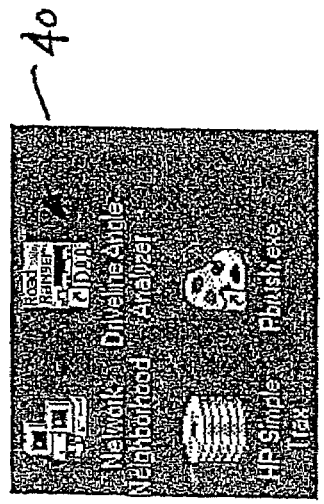
FIG. 4 shows the Driveline Angle Analyzer shortcut icon located on the user's computer desktop.

To begin the DAA program, the user can click on a Driveline Angle Analyzer shortcut icon 40 located on the user's computer desktop, as shown in FIG. 4. Alternatively, the user can start the DAA program by clicking on Start/Program/Driveline Angle Analyzer from the START button (not shown) located at the lower left corner of the user's computer screen.

Figure 5:
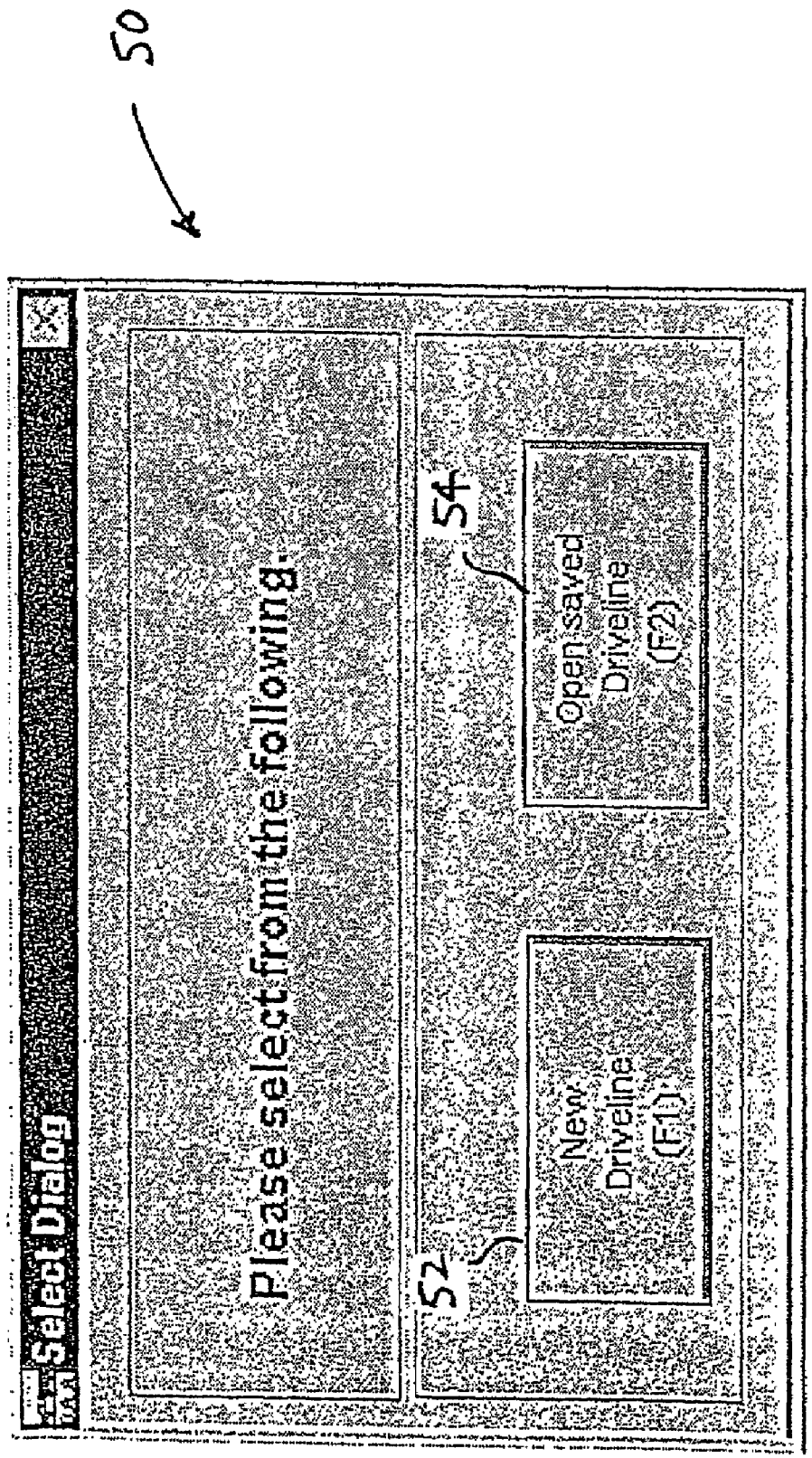
FIG. 5 shows a "Select Dialog" screen displayed by the Drive Angle Analyzer (DAA) program.

After starting the DAA program, the DAA program may display a splash screen (not shown). Next, the DAA program will display a "Select Dialog" screen 50, as shown in FIG. 5. The "Select Dialog" screen 50 allows the user to select a driveline configuration by clicking on the "New Driveline (F1)" button 52 or by depressing the F1 key on the user's keyboard. Alternatively, the user can select a driveline angle file previously saved by the user by clicking on the "Open saved Driveline (F2)" button 54 or by depressing the F2 key on the user's keyboard.

Figure 6:
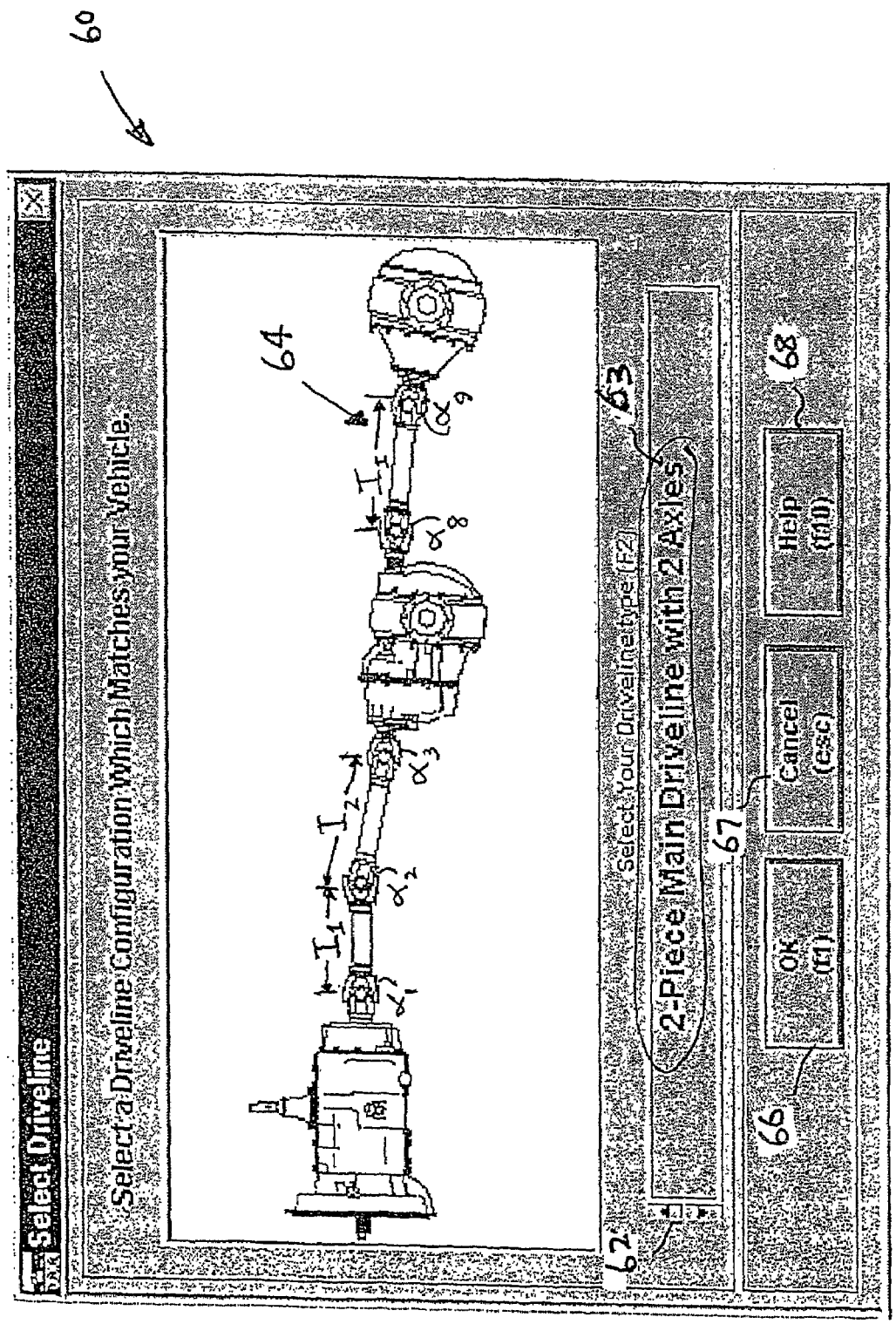
FIG. 6 shows a "Select Driveline" screen displayed by the DAA program.

If the user clicks on the "New Driveline (F1)" button 52, the DAA program will display a "Select Driveline" screen 60, as shown in FIG. 6. A pulldown menu 62 in the center of the "Select Driveline" screen 60 allows the user to select a driveline configuration 63 from a plurality driveline configurations supported by the DAA program. To aide the user in making the correct choice, a picture 64 of each driveline configuration is displayed by the DAA program while the user is selecting on the driveline configuration of interest.

When the user has selected the driveline configuration 63 of interest, the user can click on the "OK (f1)" button 66 or depress the F1 key on the user's keyboard to select the desired driveline configuration. For example, the user may select the "2-Piece Main Driveline with 2 Axles" as the driveline configuration 63 of interest, as shown in FIG. 6. Alternatively, the user can select the "Cancel (esc)" button 67 to display the previous "Select Dialog" screen 50 or depress the (Esc) key on the user's keyboard. If the user needs instructions on the DAA program, for example, how to select the driveline configuration, the user can select the "Help (f10)" button 68 or depress the F10 key on the user's keyboard.

Figure 20:
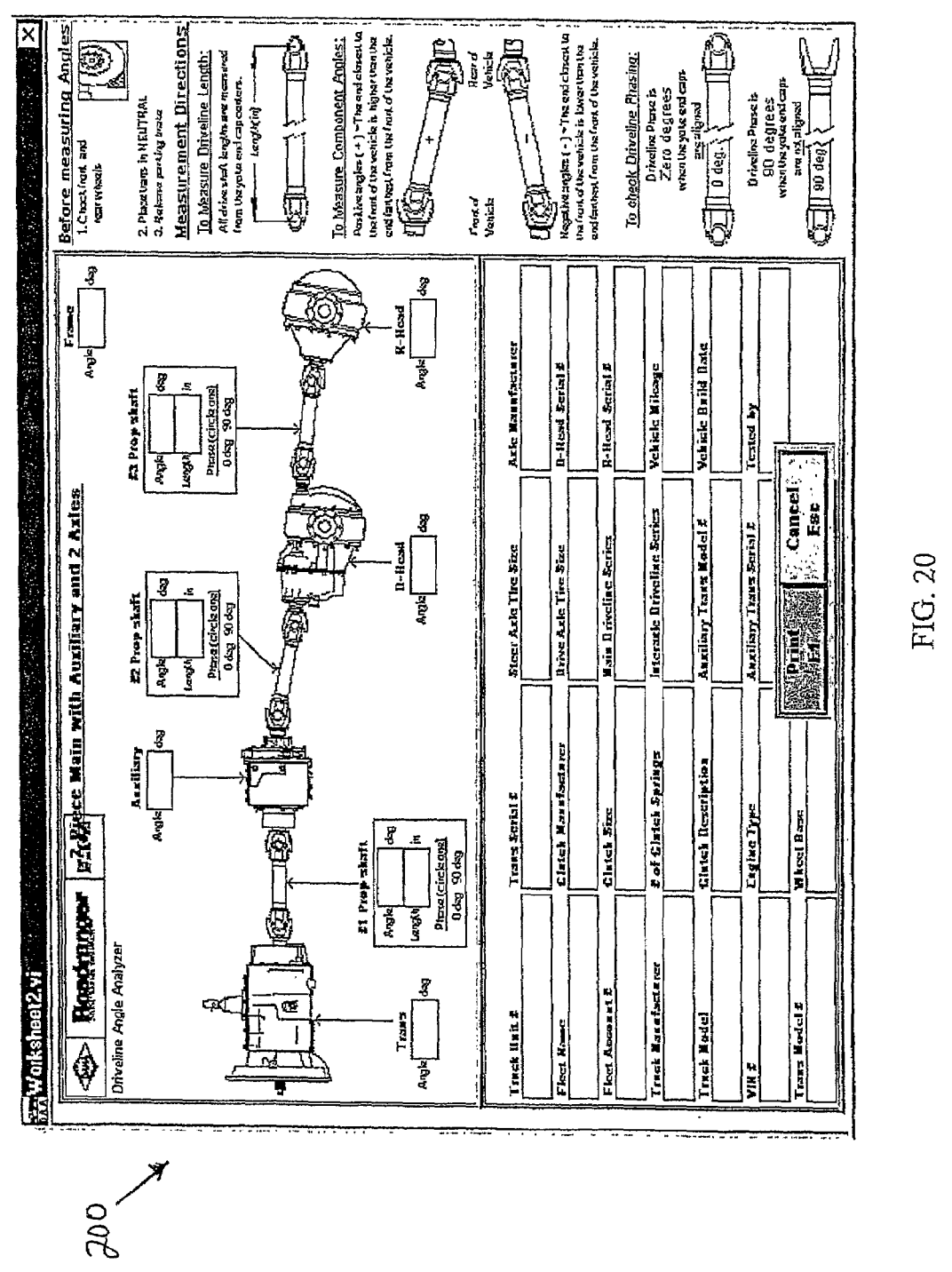
Figure 21:
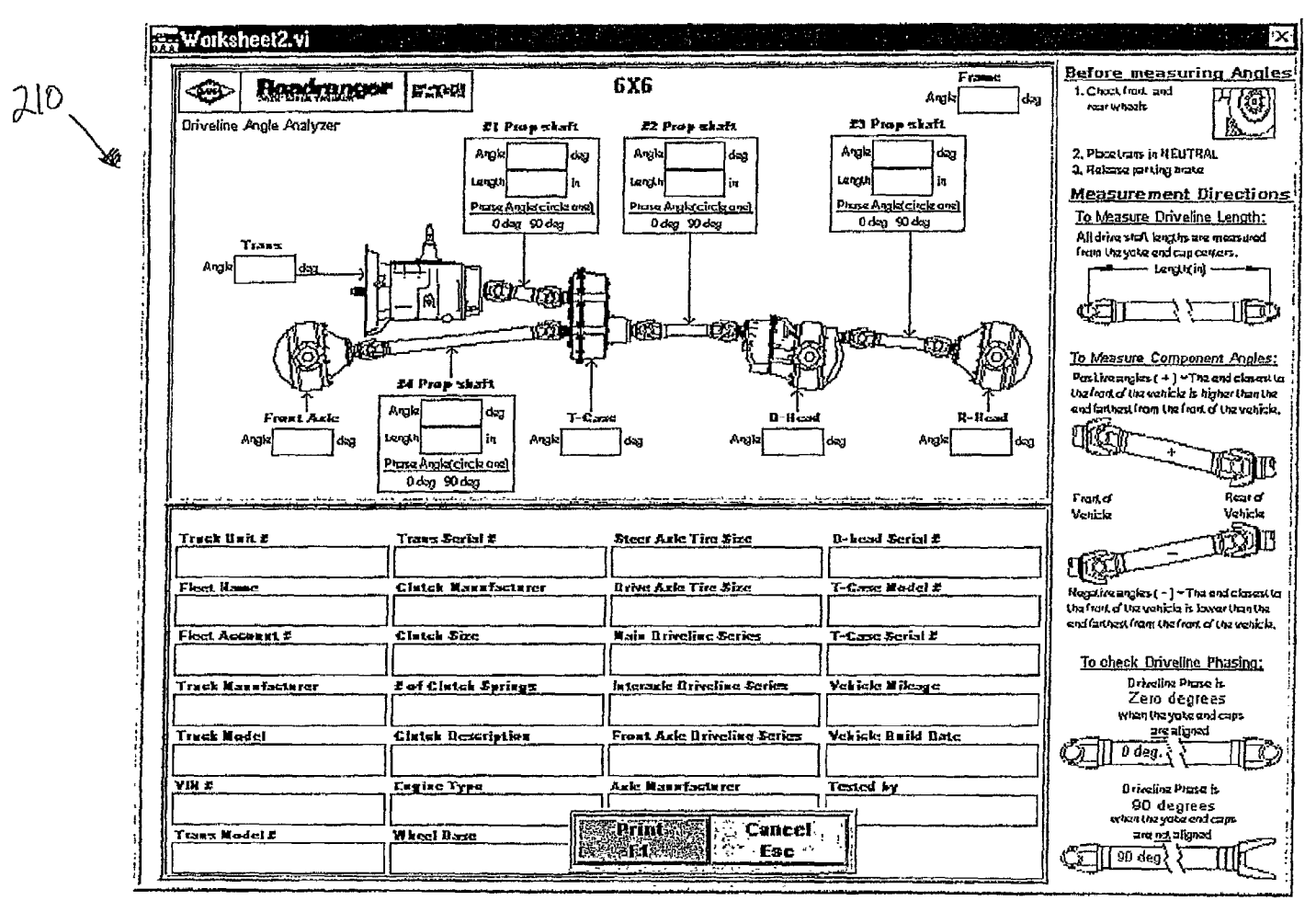

Preferably, the driveline configuration 63 of interest is a driveline configuration that matches the user's vehicle. Once the user selects a driveline configuration, all subsequent screens in the DAA program will then match the selected driveline configuration 63. It will be appreciated that the DAA program is not limited by the number of driveline configurations that can be selected by the user, and that the invention can be practiced with any number of selectable driveline configurations. For example, the DAA program can determine the torsional accelerations and driveline inertias for a "2-Piece Main with Auxiliary and 2 Axles" driveline configuration 200 and a "6×6" driveline configuration 210, as shown in FIGS. 20 and 21, respectively.

Referring now to FIG. 5, if the user selects the "Open saved Driveline (F2)" button 54 on the "Select Dialog" screen 50, the DAA program will display the contents of file folder consisting of one or more driveline files previously saved by the DAA program. The file folder opened by the DAA program may be previously selected by the user as a preferred file folder. Once the file folder is opened by the DAA program, the user can browse the list of saved files and select the saved file of interest by identifying the saved file by its name and properties and double clicking on the saved file.

Figure 7:
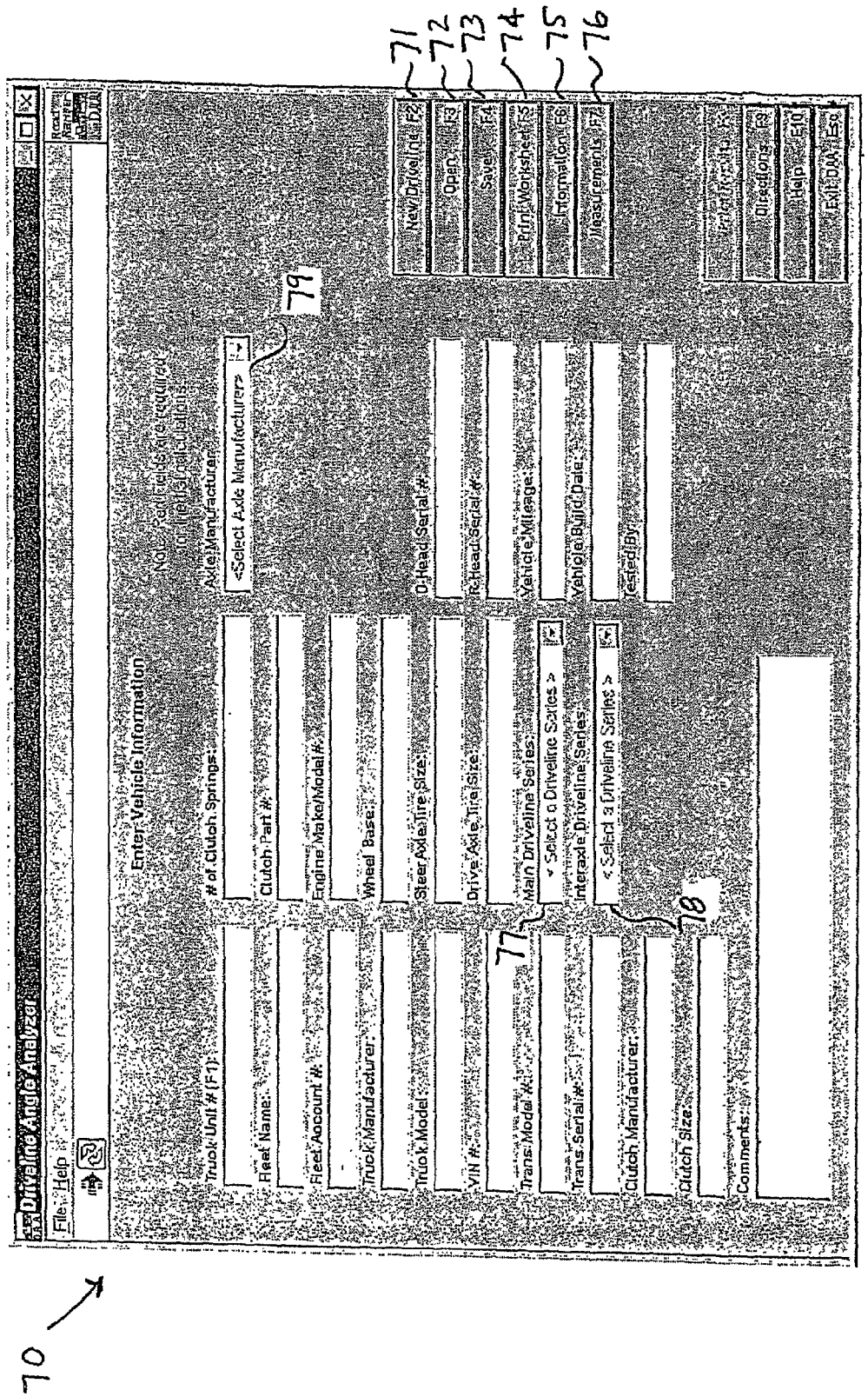
FIG. 7 shows a main "Driveline Angle Analyzer" screen displayed by the DAA program.

Once the user has either selected the driveline configuration 63 by either choosing a new driveline configuration or by opening a saved driveline configuration, the DAA program will display a main "Driveline Angle Analyzer" screen 70 that allows the user to enter vehicle information, as shown in FIG. 7. While it is recommended that all the fields on this screen be entered by the user, the DAA program requires only information for the fields highlighted in a color, such as red, to be entered by the user.

Figure 8:
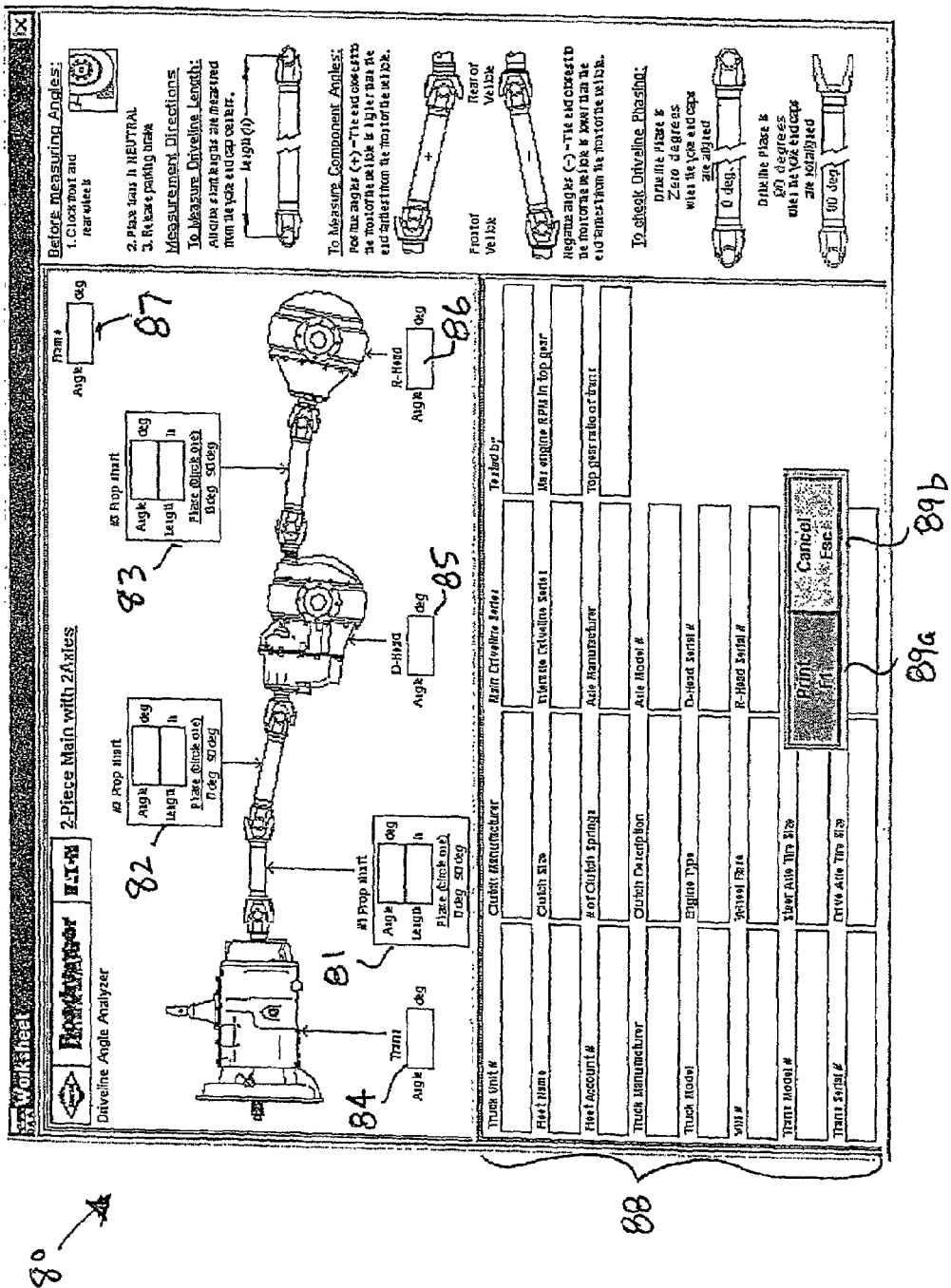
FIG. 8 shows a screen-formatted "Worksheet" screen displayed by the DAA program.

One aspect of the invention is that the user can print out a worksheet to aide in collecting the vehicle information and driveline measurements. The worksheet can be printed by clicking on the "Print Worksheet F5" button 74 or by depressing the F5 key on the user's keyboard to display a "Worksheet" screen 80, as shown in FIG. 8. Preferably, the "Worksheet" screen 80 is screen formatted to allow the printing all the vehicle information and measurement fields required by the DAA program for the selected driveline configuration 63.

When taking vehicle measurements and collecting the information required by the DAA program, the user should recreate the same conditions under which any driveline problem may occur. For example, if the noise or vibration occurs when the vehicle is loaded with a full trailer, then the driveline measurements should be taken with a fully loaded trailer attached to the vehicle. In addition, the user should park the vehicle on a level surface, chock or block the wheels fore and aft to prevent vehicle movement, check to see if the emergency/parking brakes are in the off position, and place the transmission in neutral.

Figure 9A:
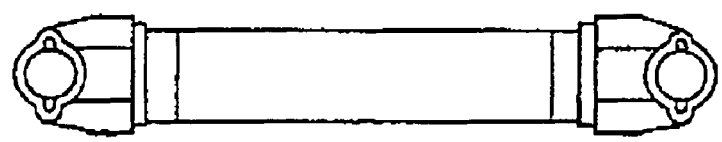
FIGS. 9a and 9b show a 0 degree and 90 degree phase orientation of a shaft of the selected driveshaft configuration for input to the DAA program, respectively.
Figure 9B:
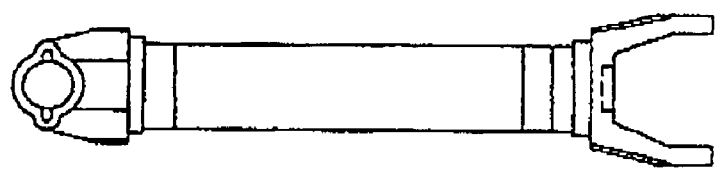

The DAA program requires the user to determine and enter the phase angle and length for each driveshaft (propshaft) of the selected driveline configuration 63 in one or more input fields 81, 82, 83 of the "Worksheet" screen 80. The DAA program allows two choices for driveshaft phase angle, 0 degrees and 90 degrees. A driveshaft has a 0 degree phase angle if the yokes on either end of the shaft line up when viewed from the side (see FIG. 9a). On the other hand, a driveshaft has a 90 degree phase angle if the yoke on either end of the shaft do not line up when viewed from the side (see FIG. 9b). The user can enter the phase angle by clicking on the appropriate value located within the appropriate input fields 81, 82, 83. To measure the angle of the driveshaft, the user can place an Inclinometer on the arm of the axle. It should be noted that the surface for measuring the angle should be parallel with the axis of the transmission or the measured angle may be incorrect.

Figure 10:
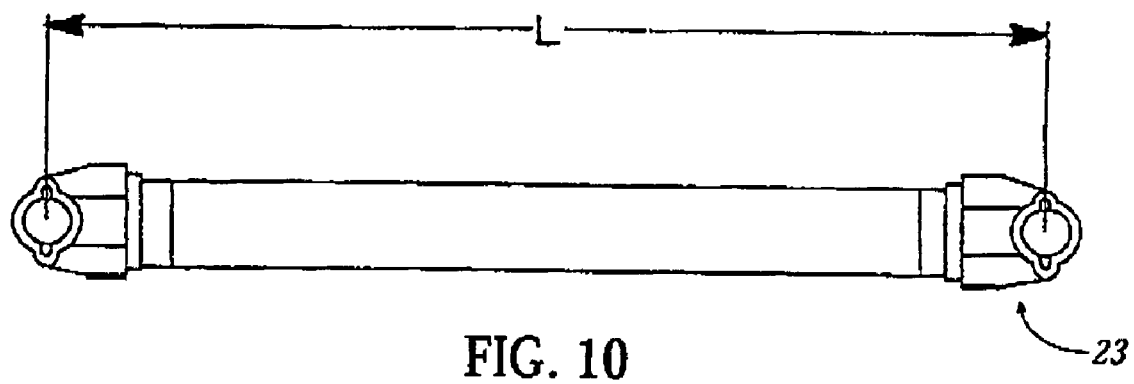
FIG. 10 shows a measurement of length of a shaft of the selected driveline configuration for input to the DAA program.

To measure the length, L, of the shafts of the selected driveline configuration 23 for the DAA program, the user can measure the length, L, (in inches) from the center of the first yoke to the center of the second yoke, as shown in FIG. 10. The shaft angle can be measured by placing an Inclinometer (not shown) on the driveline tube, or by using a V-Block (not shown) if a large enough flat area is not available. The user then enters the length of each driveshaft within the appropriate input fields 81, 82, 83.

Figure 11A:
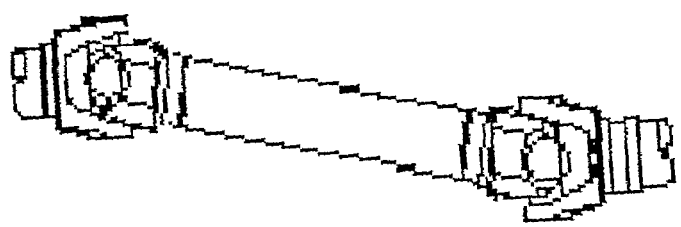
FIGS. 11a and 11b show a positive angle orientation and a negative angle orientation for a component of the selected driveline configuration for input to the DAA program, respectively.
Figure 11B:
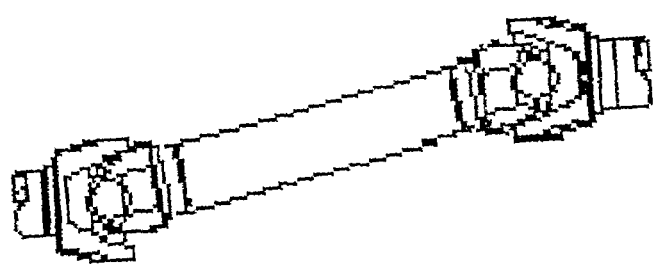

The DAA program also requires the user to determine and enter an angle orientation for each component of the selected driveshaft configuration 63 in one or more input fields 84, 85, 86 of the "Worksheet" screen 80. The DAA program allows two choices for the angle orientation for each component, positive (+) or negative (−). A component is at a positive angle when the end closest to the front of the vehicle is higher in elevation than the end farthest from the front of the vehicle, as shown in FIG. 11a. Conversely, a component is at a negative angle when the end closest to the front of the vehicle is lower in elevation than the end farthest from the front of the vehicle, as shown in FIG. 11b. It should be noted that components should be viewed from the front of the vehicle to the rear, even for vehicles with reversed axle mounting (i.e., front axle on 4×4 and 6×6's).

The DAA program requires the user to determine the angle of the vehicle frame rail (not shown) and enter the measure value into an input field 87 of the "Worksheet" screen 80. The user can measure the angle of the vehicle frame rail by placing a digital protractor (not shown) on the vehicle frame rail to measure the angle of the vehicle frame rail. The angle of the vehicle frame rail can also be measured by placing the Inclinometer on the 8-bolt PTO cover. A V-Block can be used if a sufficiently large flat are is not available on the PTO cover. If the 8-bolt PTO cover is being used or does not exist locate another flat or machined surface to obtain the measurement of the vehicle frame angle.

The user can also enter information for various other input fields, generally indicated at 88, of the "Worksheet" screen 80. In general, the input fields 88 require information that is readily available to the user and do not require measurements by the user.

Once the user has entered the information on the "Worksheet" screen 80, the user can print the information on the "Worksheet" screen 80 by clicking on the "Print F1" button 89a or by depressing the F1 key on the user's keyboard. In addition, the user can cancel the entering of information on the "Worksheet" screen 80 at any time by clicking on the "Cancel Esc" button 89b or by depressing the ESC key on the user's keyboard to return to the "Driveline Angle Analyzer" screen 70.

Referring now to FIG. 7, the main "Driveline Angle Analyzer" screen 70 allows the user to select from several options. For example, the user can select a new driveline configuration by clicking on the "New Driveline F2" button 71 or by depressing the F2 key on the user's keyboard. In addition, the user can select to open an existing baseline driveline configuration by clicking on the "Open F3" button 72 or by depressing the F3 key on the user's keyboard. It should be noted that the "New Driveline F2" button 71 and the "Open F3" button 72 of the "Driveline Angle Analyzer" screen 70 perform substantially the same functions as the "New Driveline (F1)" button 52 and the "Open saved Driveline (F2)" button 54 on the "Select Dialog" screen 50.

In addition, the DAA program allows the user to save the current "Baseline" driveline configuration by clicking on the "Save F4" button 73 or by depressing the F4 key on the user's keyboard. The DAA program also allows the user to read additional information relating to the selected driveline configuration 63 by clicking on the "Information F6" button 75 or by depressing the F6 key on the user's keyboard.

Figure 12:
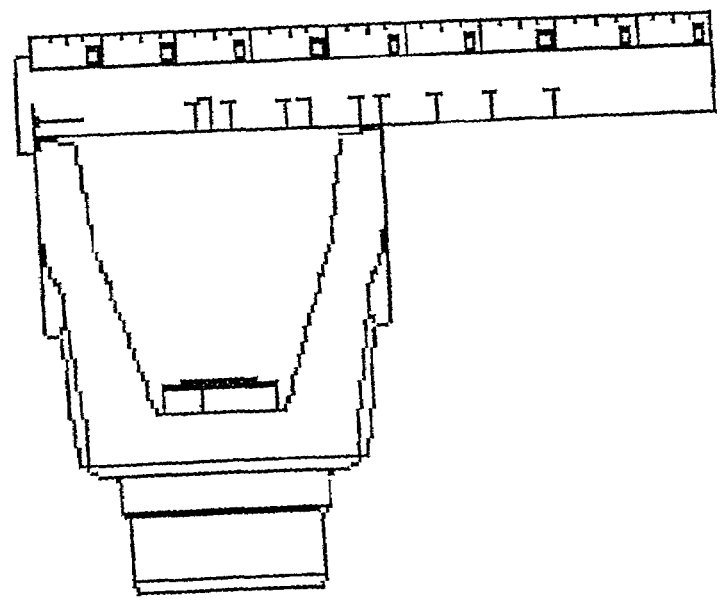
FIG. 12 shows a measurement of a diameter of a driveshaft yoke for input to the DAA program.
Figure 13:
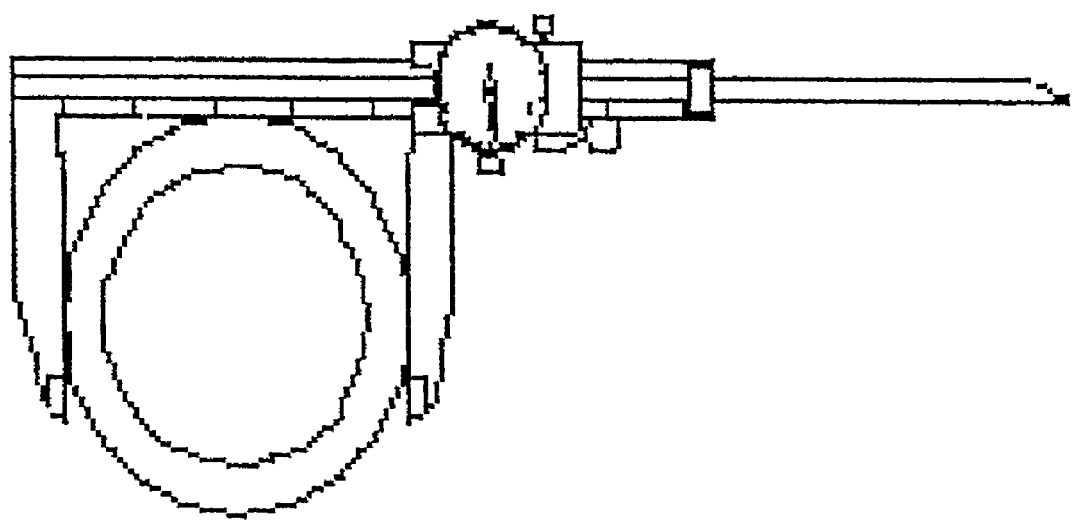
FIG. 13 shows a measurement of a driveshaft tube diameter for input to the DAA program.

The main "Driveline Angle Analyzer" screen 70 requires the user to determine the "Main Driveline Series" and the "Interaxle Driveline Series" and enter this information into the input fields 77 and 78, respectively. To determine the main and interaxle driveshaft series, the user may be required to measure the diameter of the driveshaft yoke of the selected driveline configuration 63. This can be accomplished by using a yoke series ruler for a particular manufacturer, as shown in FIG. 12. In addition, the user may be required to determine the diameter of the driveshaft tube by placing a tube measurement tool, such as a vernier caliper with 5-inch jaws, against the driveshaft tube, as shown in FIG. 13. While holding the caliper perpendicular to the tube, the jaws of the caliper can be closed until both caliper jaws are touching the tube. The caliper display can be read to obtain the driveshaft tube diameter (inches). The user can then use the measurements of the yoke diameter and the driveshaft tube diameter to determine the main and interaxle driveshaft series from a conversion chart or lookup table.

The main "Driveline Angle Analyzer" screen 70 also requires the user to determine the manufacturer of the selected driveline configuration 63 and enter the information into the input field 79. The DAA program provides the user with a list of supported manufacturers to enable the user to select from the list.

Figure 14:
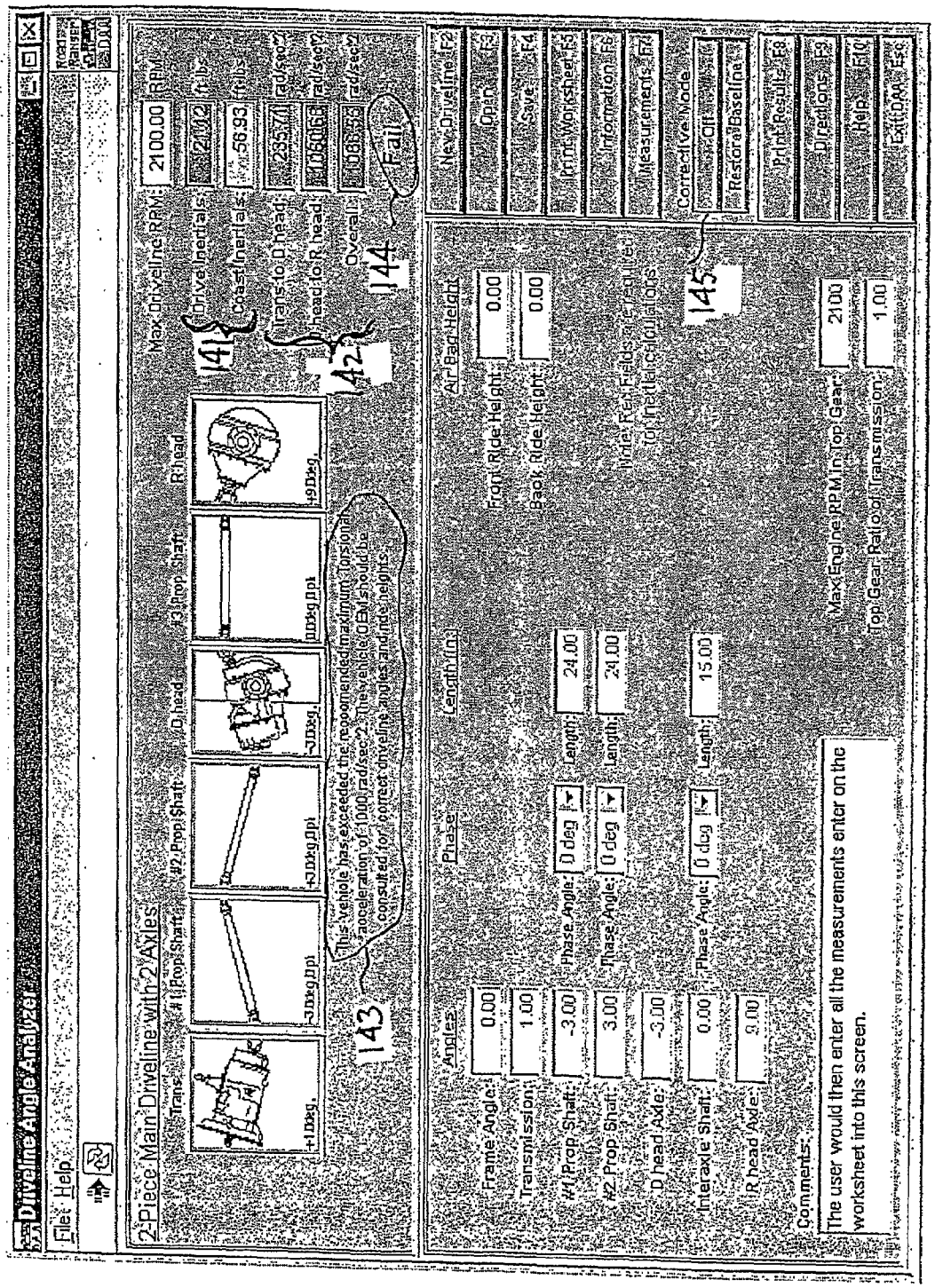
FIG. 14 shows a "Driveline Angle Analyzer" measurements screen in which one of the torsional accelerations and driveline inertias have been exceeded as determined by the DAA program.

After the user has entered data into the required fields in the "Driveline Angle Analyzer" screen 70 and has obtained all the information the "Worksheet" screen 80, the user can click on the "Measurements" button 76 or depresses the F7 key on the user's keyboard to display the "Driveline Angle Analyzer" measurements screen 140, shown in FIG. 14. The "Driveline Angle Analyzer" measurements screen 140 requires the user to enter the information for the selected driveline configuration 63 into all the input fields that are highlighted with a color, such as red.

Another aspect of the invention is that the DAA program is an interactive program such that the pictorial display (shown in FIG. 14) of the selected driveline configuration 63 will change as the information in real-time as the information is entered by the user to reflect the changes in the component orientations. In addition, the current determination of the driveline inertia and torsional acceleration are displayed in fields 141 and 142, respectively. If the fields 141 for the driveline inertia are greater than 100 ft-lbs, then the field's background will be highlighted in a color, such a red, and a message 143 will appear stating that the recommended maximum driveline inertia has been exceeded. Similarly, if the fields 142 for the torsional acceleration is greater than 1000 rad/sec*2, the field's background color will be highlighted in a color, such as red, and a message will appear stating that the recommended maximum torsional acceleration has been exceeded. In addition, the DAA program will display "Fail" 144 indicating that the current driveline inertias and/or torsional accelerations have been exceeded for the selected driveline configuration 63.

The DAA program is programmed to enable a microprocessor (not shown) to solve a series of equations for determining the torsional acceleration and driveline inertia for the vehicle driveline configuration. For example, for the "2-Piece Main with 2 Axles" driveline configuration shown in FIG. 6, the torsional acceleration for the 2-Piece Main driveline portion can be determined by the following:

$$\theta_M = \frac{RPM^2}{299356}(\alpha_1^2 \pm \alpha_2^2) \quad (1)$$

where, $\theta_M$ is the torsional acceleration (rad/sec$^2$), $\alpha_n$ is the working angle between two components (rad), and 299356 is a conversion factor for RPM$^2$ to rad/sec.

The inertias (drive and coast) for the 2-Piece Main driveline portion can be determined by the following:

$$T_D = \left(\frac{RPM^2}{299356}\right)[I_1\alpha_1^2 + I_2(\alpha_1^2 \pm \alpha_2^2)] \quad (2)$$

$$T_C = \left(\frac{RPM^2}{299356}\right)[I_2\alpha_3^2 + I_1(\alpha_2^2 \pm \alpha_1^2)] \quad (3)$$

where, $T_D$ is the drive inertia, $T_C$ is the coast inertia, and $I_n$ is the inertia between two components.

The torsional acceleration and inertias (drive and coast) for the Interaxle driveline portion can be determined as follows:

$$\theta_I = \left(\frac{RPM^2}{299356}\right)\alpha_8^2 \quad (4)$$

$$T_{I_D} = \left(\frac{RPM^2}{299356}\right)I_I\alpha_8^2 \quad (5)$$

$$T_{I_C} = \left(\frac{RPM^2}{299356}\right)I_I\alpha_9^2 \quad (6)$$

The overall torsional acceleration and inertia for the "2-Piece Main With 2 Axles" driveline configuration can be determined as follows:

$$\theta_{OVERALL} = \sqrt{\theta_M^2 + \theta_I^2} \quad (7)$$

$$T_{D_{OVERALL}} = \sqrt{T_D^2 + T_{I_D}^2} \quad (8)$$

$$T_{C_{OVERALL}} = \sqrt{T_C^2 + T_{I_C}^2} \quad (9)$$

It will be appreciated that the above equations can be applied by one skilled in the art to a wide variety of driveline configurations, and that the invention is not limited by the illustrated driveline configuration. In addition, it will be appreciated that the invention is not limited by the programming language or operating system used to solve the above equations, and that the invention can be practiced by using any suitable programming language and operating system.

Figure 15:
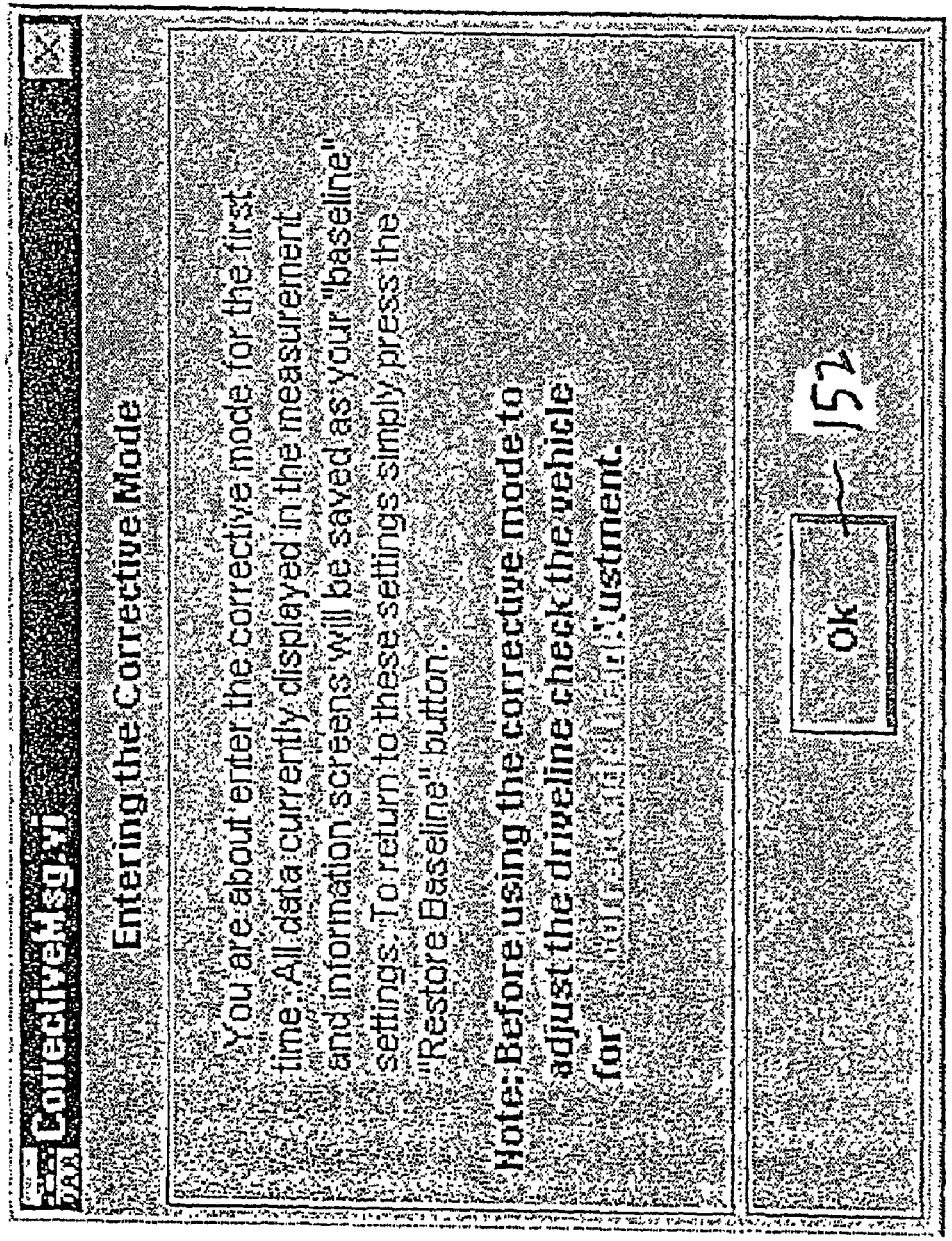
FIG. 15 shows a "CorrectMsg.vi" screen displayed by the DAA program for entering into the "Corrective Mode" of the DAA program.

Yet another aspect of the invention is that the user can then select a "Corrective Mode" to enable the user to change the driveline measurement information to improve the selected driveline configuration 63 and reduce the driveline inertias and torsional accelerations as determined by the DAA program. To enter the "Corrective Mode," the user can click on the "Corrective Mode on/off" button 145 on the on the "Driveline Angle Analyzer" measurements screen 140. Next, the DAA program will display a "CorrectiveMsg.vi" screen 150, as shown in FIG. 15. The "Corrective Msg.vi" screen 150 informs the user that they are entering the "Corrective Mode" and that the DAA program has saved the vehicle information previously entered by the user for the selected driveline configuration as "Baseline" settings. In addition, the DAA program will also recommend that the user check the vehicle ride height before making any component changes to the selected driveline configuration. If acceptable to the user, the user can click the "Ok" button 152 to enter the "Corrective Mode."

Figure 16:
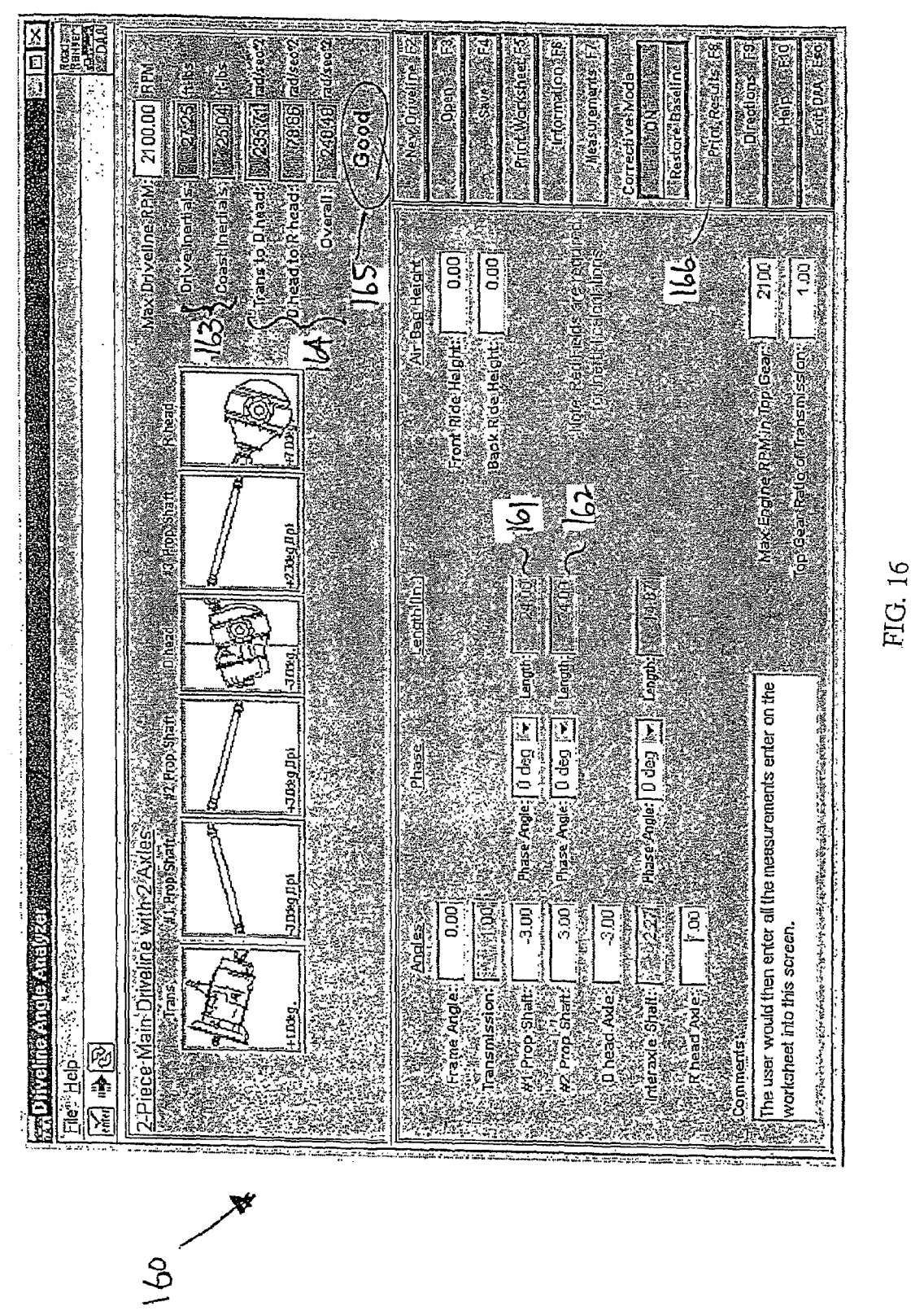

Referring now to FIG. 16, the "Drive Angle Analyzer" screen, shown generally at 160, displayed by the DAA program for the "Corrective Mode" is substantially identical to the "Drive Angle Analyzer" measurements screen 140 in which the user entered component measurements. However, it should be noted that some of the input fields for the "Corrective Mode" may be disabled and/or grayed out by the DAA program. These disabled fields represent, for example, components for which either do not have pivot point information or values, which the user could not change without changing the vehicle's wheelbase.

For example, if the user were able to change the length of a driveshafts (propshaft) in the fields 161 and 162, a change to the vehicle's wheelbase to keep a "connected vehicle geometry" would be required by the DAA program. Because the change to the vehicle's wheelbase would be either difficult or impossible to do, the DAA program disables or grays the fields 161 and 162 for the length of the vehicle driveshaft. When the user has changed the allowed input fields in the "Driveline Angle Analyzer" screen 160 to improve and reduce the "Baseline" values such that the driveline inertias 163 and torsional inertias 164, the DAA program will display "Good" 165 indicating that the driveline inertias and/or torsional accelerations no longer exceed the maximum recommended driveline inertia and torsional inertia.

Figure 17:
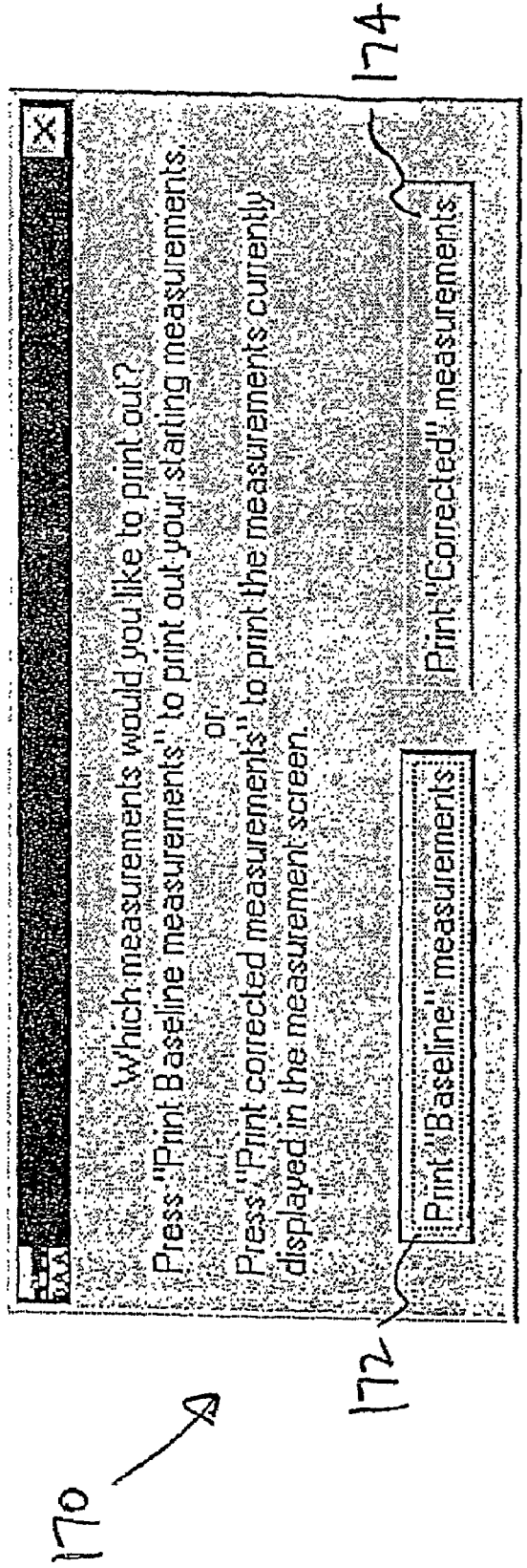
FIG. 17 shows a "Print" screen displayed by the DAA program for printing the results from either the "Baseline" measurements or the "Corrected" measurements.
Figure 18:
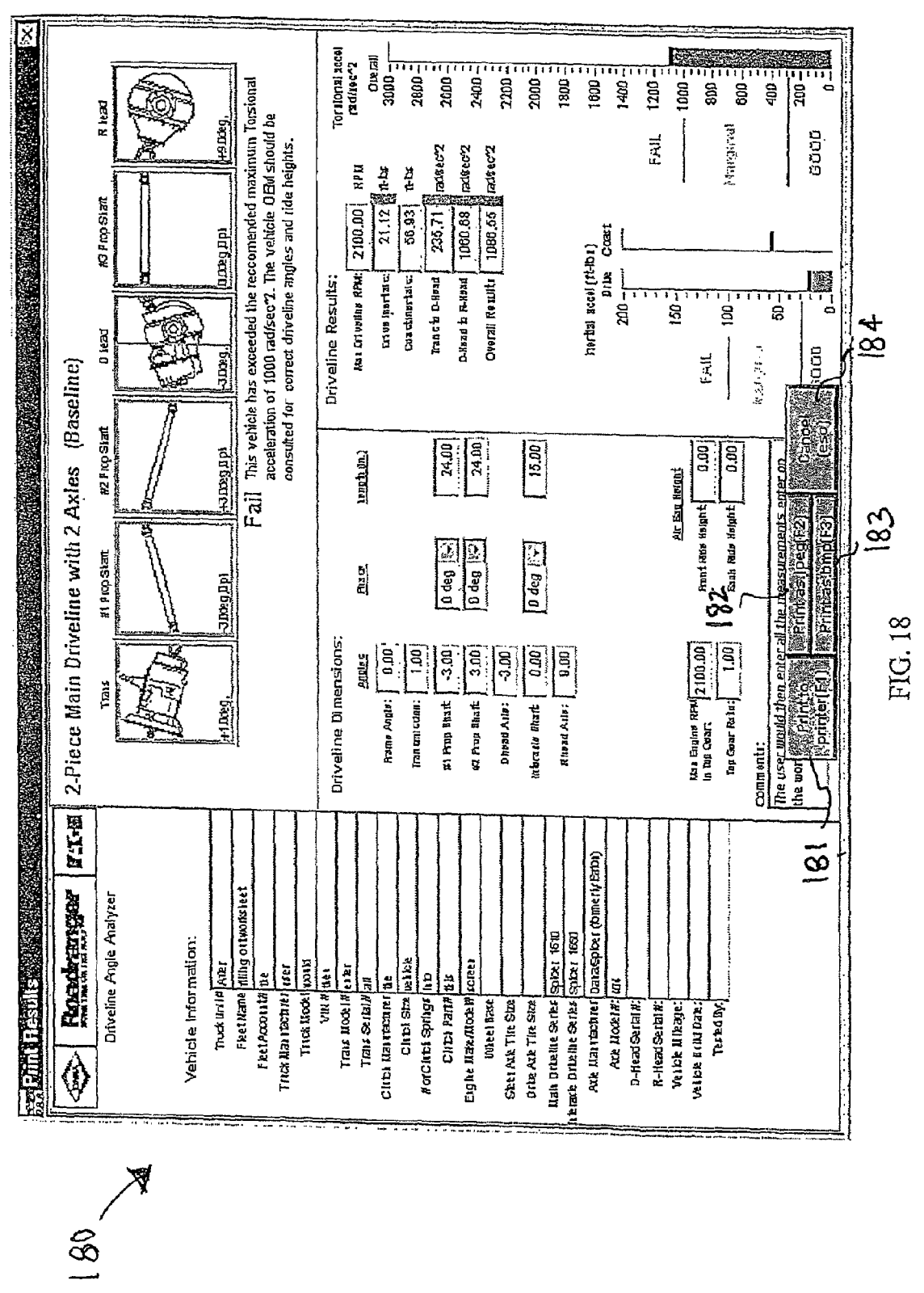

To print the results from the DAA program, the user can click on the "Print Results" button 166 or depress the F8 key on the user's keyboard. As shown in FIG. 17, the DAA program then displays a screen 170 that asks the user to select from two possible printouts. The user can print the "Baseline" measurement values by clicking on the "Print 'Baseline' measurements" button 172. Alternatively, the user can print the corrected driveline values by clicking on the "Print 'Corrected' measurements" button 174. If the user selects to print the "Baseline" measurement results, the DAA program displays a "Print Results" screen 180 showing the starting or "Baseline" values, as shown in FIG. 18. The displayed screen 180 can either be sent to a local or network printer for paper printing by clicking on the "Print to printer (F1)" button 181 or by depressing the F1 key on the user's keyboard. In addition, the user can save the results as a .jpeg image file by clicking on the "Print as .jpeg (F2) button 182 or by depressing the F2 key on the user's keyboard. Further, the user can save the results as a .bmp image file by clicking on the "Print as .bmp (F3) button 183 or by depressing the F3 key on the user's keyboard. The user can cancel the printing of the results on the "Print Results" screen 180 at any time by clicking on the "Cancel (esc)" button 184 or by depressing the ESC key on the user's keyboard to return to the "Driveline Angle Analyzer" screen 140.

Figure 19:
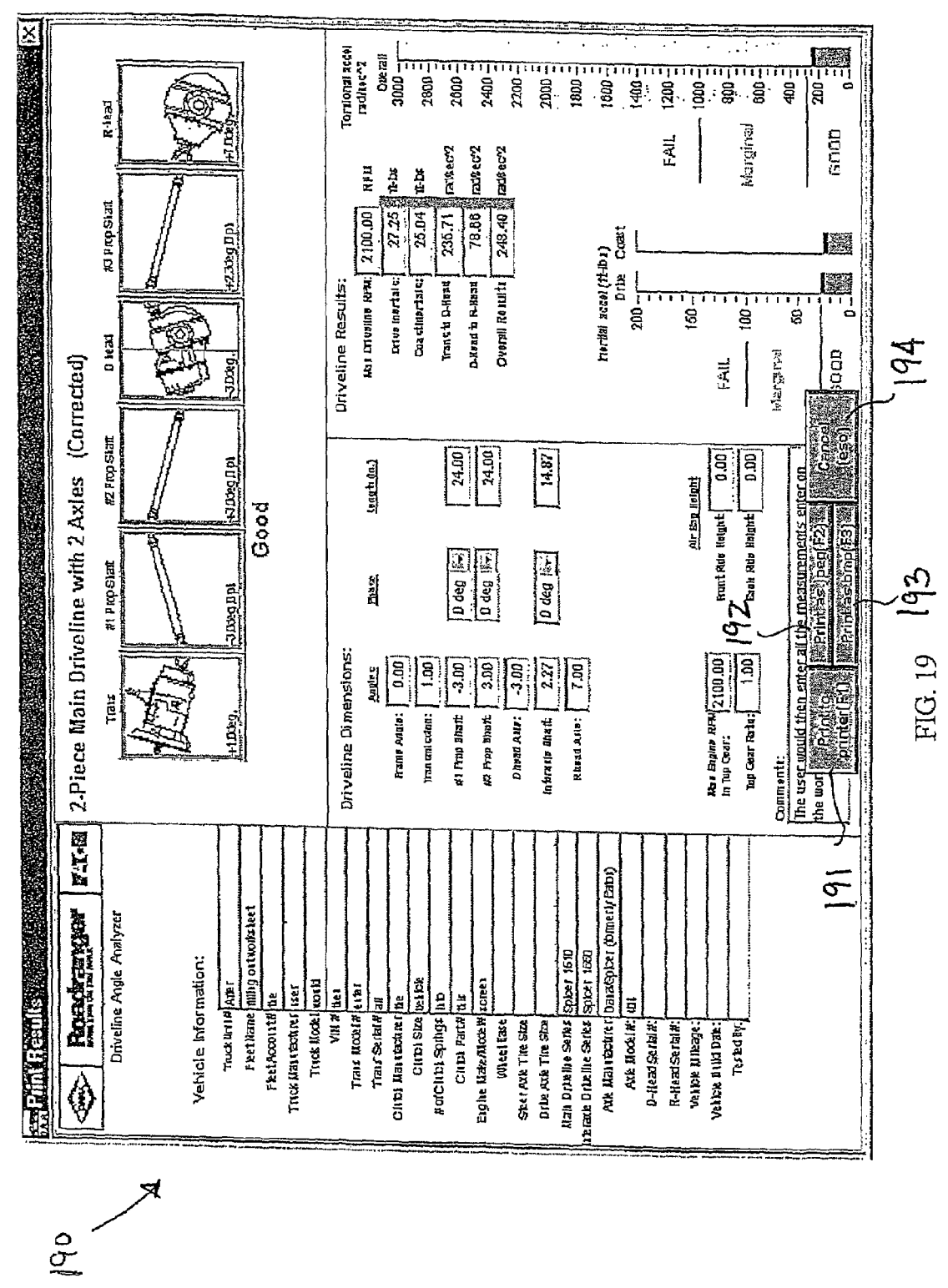

If the user selects to print the "Corrected" measurement results, the DAA program displays a "Print Results" screen 190 showing the "Corrected Mode" values, as shown in FIG. 19. The displayed screen 190 can either be sent to a local or network printer for paper printing by clicking on the "Print to printer (F1)" button 191 or by depressing the F1 key on the user's keyboard. In addition, the user can save the results as a .jpeg image file by clicking on the "Print as .jpeg (F2) button 192 or by depressing the F2 key on the user's keyboard. Further, the user can save the results as a .bmp image file by clicking on the "Print as .bmp (F3) button 193 or by depressing the F3 key on the user's keyboard. The user can cancel the printing of the results on the "Print Results" screen 190 at any time by clicking on the "Cancel (esc)" button 194 or by depressing the ESC key on the user's keyboard to return to the "Driveline Angle Analyzer" screen 140.

As described above, a method of determining a torsional acceleration and inertias of a vehicle driveline by entering measurements of a vehicle driveline configuration into a graphical user interface program is disclosed. The user can select the driveline configuration of interest from a plurality of driveline configurations. Then, the user enters information, such as driveline measurements relating to the selected driveline configuration. To aide in gathering the correct information, the user can print out a worksheet for the selected driveline configuration. After the user inputs the information for the selected driveline configuration, the user can select a corrective mode that allows the user to improve the selected driveline configuration. For example, the user can change the angle of a component with the surrounding components by changing their angles and/or length to stay connected, thus maintaining the vehicle's driveline geometry.

Preferred embodiments of the present invention have been disclosed. A person of ordinary skill in the art would realize, however, that certain modifications would come within the teachings of this invention. Therefore, the following claims should be studied to determine the true scope and content of the invention.

What is claimed is:

1. A computer implemented method of determining a driveline inertia of a vehicle driveline resulting from an oscillatory speed effect in a vehicle driveline configuration, the driveline including a driveline component rotationally coupled to a propshaft at a non-zero working angle using a universal joint, the method comprising:
    entering measurements of the vehicle driveline configuration into a graphical user interface program, wherein the entered measurements of the driveline configuration includes measurements indicative of working angle between the propshaft and the driveline component;
    determining an oscillatory speed effect of the vehicle driveline component based on the entered measurements;
    determining a driveline inertia resulting from an oscillatory speed effect of the vehicle driveline by using, at least in part, the rotational speed of the driveline component, the working angle between the driveline component and the propshaft, the inertia of the driveline component, and the inertia of the propshaft; and
    providing an output indicative of the driveline inertia in a tangible medium.

2. The method of claim 1, further including the step of selecting a representative vehicle driveline configuration from a plurality of driveline configurations prior to entering measurements of the vehicle driveline configuration into the graphical user interface program.

3. The method of claim 1, wherein the graphical user interface program includes a corrective mode for enabling a user to interactively change the entered measurements of the vehicle driveline configuration.

4. The method of claim 1, further including the step of printing a worksheet to aide a user in entering of the measurements for the vehicle driveline configuration.

5. The method of claim 1, further including the step of printing results from the determination of the driveline inertia.

6. The method of claim 1, further including the step of saving results from the determination of the driveline inertia as an image file.

7. The method of claim 1, further comprising selecting a representative vehicle driveline from a plurality of saved driveline configurations, wherein the step of selecting includes comparing a picture of a selectable driveline configuration to the vehicle driveline.

8. The method of claim 1, wherein determining the oscillatory speed effect of the driveline configuration includes determining the oscillatory speed effect of the driveline configuration based upon, at least in part, the inertia of the propshaft.

9. The method of claim 1, further comprising
    reconfiguring the driveline to a second driveline configuration;
    entering measurements of the second driveline configuration into the graphical user interface program, wherein entering measurements of the second driveline configuration includes entering measurements of an angle of the propshaft relative to a reference plane and an angle of the driveline component relative to the reference plane; and
    determining an oscillatory speed effect of the second driveline configuration based upon the entered measurements of the second driveline configuration.

10. The method of claim 1, wherein determining the oscillatory speed effect of the driveline configuration includes determining the oscillatory speed effect of the driveline configuration based upon, at least in part, a rotational speed of the propshaft.

11. The method of claim 1, wherein, the driveline inertia is determined, at least in part, by the Equation $$T_D = \left(\frac{RPM^2}{299356}\right)[I_1\alpha_1^2 + I_2(\alpha_1^2 \pm \alpha_2^2)]$$

where:
$T_D$ is drive inertia,
RPM is the rotational speed of the driveline component,
$I_1$ is the inertia of the driveline component,
$I_2$ is the inertia of the propshaft,
$\alpha_1$ is the working angle between the driveline component and a reference plane (rad),
$\alpha_2$ is the working angle between the propshaft and the reference plane (rad), and
299356 is a conversion factor for $RPM^2$ to $rad/sec^2$.

12. A computer implemented method of diagnosing driveline angles and lengths of components of a vehicle driveline, the driveline including a driveline component rotationally coupled to a propshaft at a non-zero working angle using a universal joint, the method comprising:
    selecting a representative vehicle driveline from a plurality of saved driveline configurations;
    entering measurements of the vehicle driveline into a graphical user interface program;
    determining a driveline inertia resulting from an oscillatory speed effect in the vehicle driveline based on the entered measurements of the driveline angles and lengths of the components, and wherein the driveline inertia is determined, at least in part, by using the rotational speed of the driveline component, the working angle between the driveline component and the propshaft, and the inertia of the propshaft; and providing an output indicative of the driveline inertia in a tangible medium.

13. The method of claim 12, further including the step of printing a worksheet to aide a user in entering of the measurements for the vehicle driveline.

14. The method of claim 12, further including the step of printing results from the determination.

15. The method of claim 12, further including the step of saving results from the determination as an image file.

16. The method of claim 12, wherein the step of selecting includes comparing a picture of a selectable driveline configuration to the vehicle driveline.

17. The method of claim 12, further comprising enabling a user to interactively change the entered measurements of the vehicle driveline to determine the changed driveline inertia of the vehicle driveline.

18. A computer implemented method of determining a driveline inertia in a desired vehicle driveline configuration, the driveline including a driveline component rotationally selectively coupled to a propshaft at a non-zero working angle using a universal joint, the method comprising:

selecting the desired vehicle driveline configuration from a plurality of driveline configurations;

entering measurement data for the desired vehicle driveline configuration;

determining a driveline inertia resulting from an oscillatory speed effect of the desired vehicle driveline configuration based on the entered measurements and wherein the driveline inertia is determined, at least in part, by using the rotational speed of the driveline component and the working angle between the driveline component and the propshaft, as generally represented by the Equation:

$$T = \left(\frac{RPM^2}{299356}\right) I_1 \alpha_8^2$$

where T is driveline inertia,

RPM is the rotational speed of the driveline component, $I_1$ is the inertia of the propshaft, $\alpha_8$ is the working angle between the driveline component and the propshaft (rad), and 299356 is a conversion factor for $RPM^2$ to rad/sec; and displaying a value representative of the driveline inertia of the desired vehicle driveline configuration.

19. The method of claim 18, further including the step of enabling a user to interactively change the entered measurements of the desired vehicle driveline configuration to determine the driveline inertia a changed vehicle driveline configuration.

20. The method of claim 18, further including the step of printing a worksheet to aide a user in entering of the measurements for the desired vehicle driveline configuration.

21. The method of claim 18, further including the step of printing results from the determination the driveline inertia for the desired vehicle driveline configuration.

22. The method of claim 18, further including the step of saving results from the determination of the driveline inertia for the desired vehicle driveline configuration as an image file.

23. The method of claim 18, wherein the oscillatory speed effect contributes to a drive inertia.

24. The method of claim 18, wherein the oscillatory speed effect contributes to a coast inertia.

* * * * *

UNITED STATES PATENT AND TRADEMARK OFFICE
CERTIFICATE OF CORRECTION

PATENT NO. : 7,660,710 B2  Page 1 of 1
APPLICATION NO. : 09/736232
DATED : February 9, 2010
INVENTOR(S) : Scott A. Sirrine It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1600 days.

Signed and Sealed this

Thirtieth Day of November, 2010

David J. Kappos
*Director of the United States Patent and Trademark Office*